United States Patent
Fox

Patent Number: 5,386,630
Date of Patent: Feb. 7, 1995

[54] PROCESS AND TOOL FOR ADJUSTING BEARINGS

[75] Inventor: Gerald P. Fox, Canton, Ohio

[73] Assignee: The Timken Company, Canton, Ohio

[21] Appl. No.: 126,982

[22] Filed: Sep. 27, 1993

[51] Int. Cl.⁶ .......................................... B23P 15/00
[52] U.S. Cl. .............................. 29/898.09; 29/898.07; 29/407
[58] Field of Search ......... 29/898.09, 898.07, 898.062, 29/407, 724; 384/450

[56] References Cited

U.S. PATENT DOCUMENTS

| | | | |
|---|---|---|---|
| 2,101,130 | 12/1937 | Christman | 29/84 |
| 3,672,019 | 6/1972 | Barnbrook et al. | |
| 3,785,023 | 7/1974 | Harbottle | 29/898.09 |
| 4,172,621 | 10/1979 | Yoshida | |
| 4,336,641 | 6/1982 | Bhatier | 29/898.09 |
| 5,125,156 | 6/1992 | Witte | 29/898.09 |
| 5,129,156 | 7/1992 | Walker | 29/898.09 |
| 5,144,743 | 9/1992 | Kempas | 29/898.09 |
| 5,206,993 | 5/1993 | Brough | 29/898.062 |

Primary Examiner—Irene Cuda
Attorney, Agent, or Firm—Polster, Lieder, Woodruff & Lucchesi

[57] ABSTRACT

A bearing assembly which enables a hub to rotate on a spindle and has two single row tapered roller bearings, is adjusted by forcing the inner races or cones together with a spacer between them, all while the hub is off the spindle. This force, which is applied by an adjusting tool that fits through the cones much like the spindle, compresses the spacer and causes it to yield both elastically and plastically. The force is applied incrementally, and with each incremental advance the drag torque in the bearing assembly is checked by simply turning the adjusting tool. When the drag torque reaches a prescribed magnitude, the compressive force is removed and the adjusting tool withdrawn. Now the two races, the collapsed spacer and the hub, are installed on the spindle, followed by a spindle nut over the end of the spindle. The spindle nut clamps the two races and the spacer together, with the spacer establishing the distance that the races are separated—and hence the setting for the bearing assembly.

17 Claims, 2 Drawing Sheets

PROCESS AND TOOL FOR ADJUSTING BEARINGS

BACKGROUND OF THE INVENTION

This invention relates in general to bearings which take axial as well as radial loads and, more particularly, to a process and tool for adjusting such bearings.

Some bearings have the capacity to transfer axial or thrust loads as well as radial loads, and when single row bearings of this character are organized in pairs, one opposing the other, they are well suited for a wide variety of machine applications, none the least of which is in mountings for the road wheels of automotive vehicles. But the bearings, when so organized, require adjustment during installation to achieve the proper setting for operation. If they are set with too much end play, a limited amount of free radial and axial motion exists in the mounting which may manifest itself in wheel wobble. In short, the mounting is not as stable as it should be. Furthermore, excessive end play causes the load zone to concentrate at a few rollers, and this may diminish the life of the bearing. Preload, on the other hand, produces a very rigid mounting, but also imparts more friction to the bearings and may cause the bearings to fail early. In most mountings it is desirable to have the bearings set near a condition often referred to as "zero end play", that is to say with a very slight amount of end play or a very slight amount of preload.

Automotive wheel bearings present a problem because they are often disassembled for inspection and lubrication, or for work on related components, such as brakes, at shops which do not have tools for accurately adjusting the bearings on reassembly. To be sure, many garages adjust the bearings for the nondriven wheels of automobiles simply by turning the spindle nuts which hold the bearings on their respective spindles, indeed turning those nuts until they feel reasonably tight. This provides a reasonably accurate setting, because the wheels are small and light in weight, making it easy to detect simply by feel the appropriate point at which all end play is eliminated. But some automotive wheels, such as those found on trucks, are much larger and heavier, and as a consequence it is difficult if not impossible to detect by feel the point at which end play is removed from the bearings.

One can adjust the bearings for a truck wheel by making incremental advances of the nut that holds the bearings on their spindle and between such advances making measurements of end play with a dial indicator. In a conventional adjusting procedure, the spindle nut is turned to a specific torque, while the wheel is oscillated to seat the rollers along the races. Next the nut is backed off one turn, retightened, again while the wheel is oscillated, until a lesser nut torgue is achieved, and then backed off again a specified amount, which to a measure depends on the pitch of the spindle thread. With a jam nut turned down against the spindle nut, the end play is measured using a dial indicator. To this end, the mechanic installs the indicator on the wheel with its stylus against the spindle end and moves the wheel axially back and forth while oscillating it, observing the reading on the indicator as he does. If excessive end play appears, the mechanic backs the jam nut off, advances the spindle nut slightly, with the magnitude of the amount being largely based on experience, tightens the jam nut, and makes another measurement. If insufficient end play exists, the mechanic follows essentially the same procedure, but backs the spindle nut off instead of turning it down. This trial and error procedure is repeated until the measured end play falls within an acceptable range.

In any event, the adjustment is made with the wheel mounted on the spindle yet elevated above the ground. Owing to the weight of the wheel, the mechanic has difficulty moving it inwardly and outwardly along the spindle axis to ascertain the extent of the end play. Furthermore, many service facilities do not have for their immediate use dial indicators required for implementing the procedure. Apart from that, dial indicators are delicate instruments which are easily damaged in a garage.

The present invention resides in a process for adjusting bearings while they are off their normal mounting, which may be a spindle, yet within a hub or other component that fits over the normal mounting. The invention also resides in a tool for making the adjustment.

DESCRIPTION OF THE DRAWINGS

In the accompanying drawings which form part of the specification and wherein like numerals and letters refer to like parts wherever they occur.

DETAILED DESCRIPTION

Figure 1:
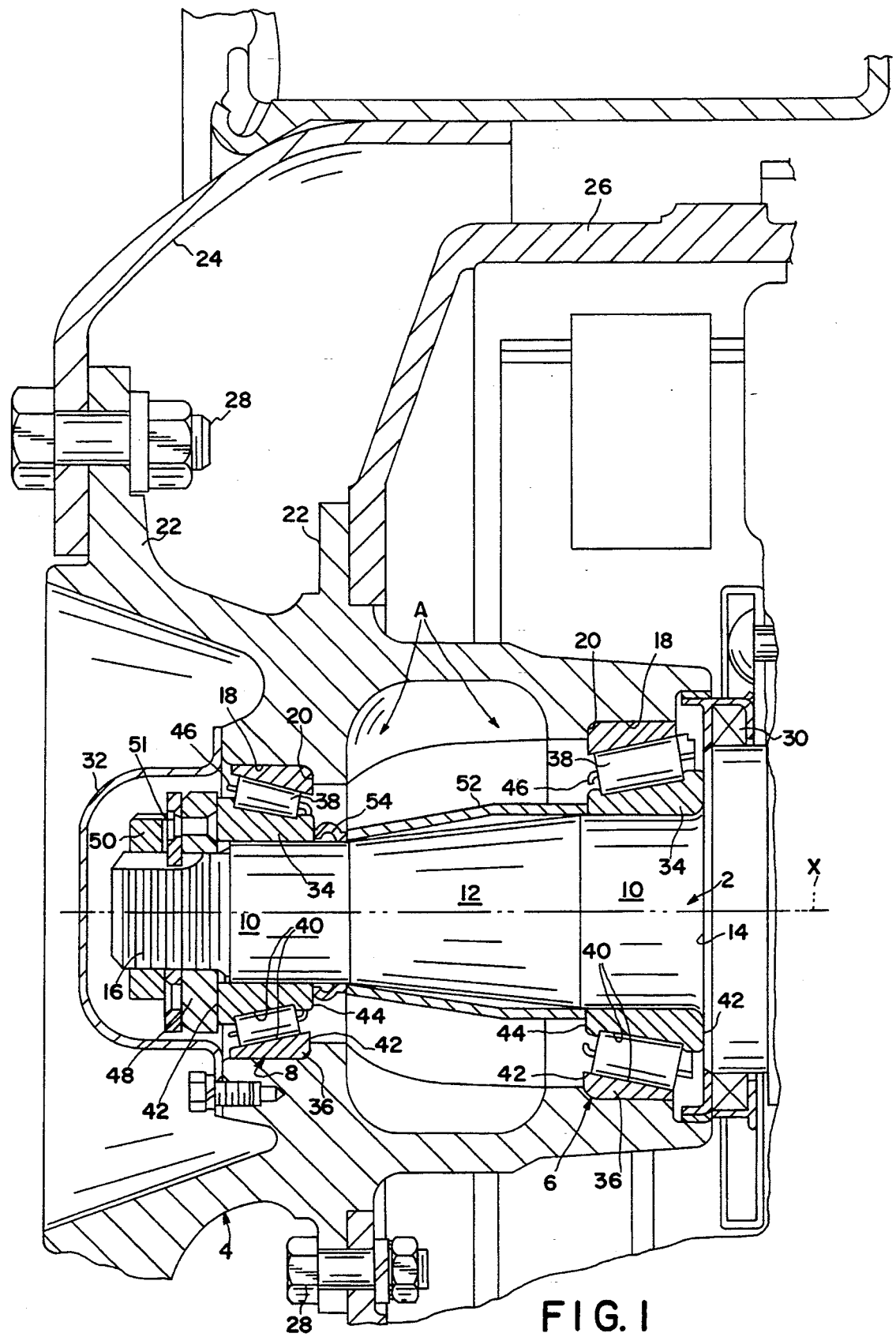
FIG. 1 is a sectional view of a bearing assembly and components connected by it, with the setting of the bearing established by a spacer that is collapsed with the tool and in accordance with the process of the present invention.

Referring to the drawings, the present invention resides in a process for adjusting a bearing assembly A (FIG. 1) that enables one machine component to rotate relative to another machine component about an axis X, which of course coincides with the axis of the bearing assembly A. In the particular example illustrated, the one machine component constitutes a spindle 2, whereas the other is a hub 4. The bearing assembly A, which surrounds the spindle 2 and lies within the hub 4, actually consists of two single row tapered roller bearings 6 and 8 which are mounted in opposition so that the bearing 6 takes thrust loads in one axial direction and the bearing 8 takes thrust loads in the opposite axial direction.

The spindle 2 has two cylindrical bearing seats 10 of differing diameter and an intervening surface 12 between the seats 10. The inboard seat 10, which is larger in diameter than the outboard seat 10, projects from a shoulder 14, whereas a threaded end 16 extends beyond the smaller seat 10. The two bearings 6 and 8 fit around the seats 10.

The hub 4 fits over the spindle 2 and the two bearings 6 and 8, it having counterbores 18 which open out of its ends and receive the bearings 6 and 8. Each counterbore 18 terminates at a shoulder 20. The hub 4 has outwardly directed flanges 22 to which a road wheel 24 and a brake drum 26 are attached with machine bolts 28. At the inboard counterbore 18 the hub 4 is further provided with a seal 30 which embraces the spindle 2 to establish a dynamic fluid barrier along the spindle 2. At its outboard end the hub 10 is fitted with an end cap 32.

The seal 30 and end cap 32 isolate the interior of the hub 10 and thereby protect the bearings 6 and 8 located in it.

Each bearing 6 and 8, being a single row tapered roller bearing, has an inner race or cone 34, an outer race or cup 36, and tapered rollers 38 arranged in a single circumferential row between the cone 34 and cup 36. Indeed, the tapered side faces of the rollers 38 contact the cone 34 and cup 36 along tapered raceways 40, and those raceways 40 are on apex, meaning that if the raceways 40 were extended to their respective apexes, those apexes would for all intents and purposes lie at a common point along the axis X. The cone 34 and cup 36 each have a back face 42, with the back face 42 of the cone 34 being beyond the large end in the cone raceway 40 and the back face 42 of the cup 36 being at the small end of the cup raceway 40. Thus, the back face 42 for the cone 34 and cup 36 face in opposite directions—and well they should, for they represent the surfaces at which thrust loads are applied to the bearing 6 or 8. At their opposite ends, the cones 34 and cups 36 have front faces 44. In addition, each bearing 6 and 8 has a cage 46 for maintaining the proper spacing between the rollers 38 and for holding the rollers 38 around the cone 34 when the cone 34 is withdrawn from the cup 36.

The cone 34 of the inboard bearing 6 fits over the large bearing seat 10 with its back face 42 against the shoulder 24 at the end of that seat. The cup 36 for the inboard bearing 6 fits into the inboard counterbore 18 in the hub 4 with its back face 42 against the shoulder 20 at the inner end of that counterbore 18. The cup 36 of the outboard bearing 8 fits into the outboard counterbore 18 of the hub 4 with its back face 42 against the shoulder 20 of that counterbore. Indeed, the two cups 36 are pressed into their respective counterbores 18 so that an interference fit exists between the hub 4 and the two cups 36, and the cups 36 and their raceways 40 are in effect fixed in position in the hub 4. Finally, the cone 34 of the outboard bearing 8 fits over the outboard bearing seat 10 on the spindle 2 with its back face 42 presented toward the threaded end 16 of the spindle 2. The bearings 6 and 8, when so oriented, create an indirect mounting—and an indirect bearing mounting will accommodate axial loads in either axial direction, as well as radial loads.

The two bearings 6 and 8 are held on the spindle 2 by a nut 48 which threads over the threaded end 16 and is turned down against the back face 42 of the outboard cone 34. Thread clearance within the nut 48 is moved from one side of the thread to the other by a jam nut 50, which is also turned down over the threaded end 16, and the transfer of clearance will remove bearing end play by nearly the same amount. Some type of locking device 51 also fits over the threaded end 16 of the spindle 2, and it may take the form of a washer which is clamped tightly between the nut 48 and jam nut 50, the washer having a tab which projects into an axial groove in threaded end 16 and dowel pins which projects from it into the nut 48 to prevent the nut 48 from turning.

Were the bearing assembly A conventional, the nuts 48 and 50 would determine its setting. If the nut 48 is turned down too far against the outboard cone 34, the clamping force imparted by it will in effect drive the rollers 38 tightly between the tapered raceways 40 and thereby impose an excessive preload. On the other hand, if the nuts 48 and 50 are not advanced far enough, clearances will exist in the bearings 6 and 8 between the rollers 38 and raceways 40, and this will permit free motion, both radially and axially, or in other words, create a condition of end play.

But in the bearing assembly A (FIG. 1), the nuts 48 and 50 merely hold the bearings 6 and 8 and hub 4 together on the spindle 2. Two spacers 52 and 54, one solid and the other collapsible, establish the setting. The spacers 52 and 54 fit around the spindle 2 between the front faces 44 of the two cones 34 and fix the spacing between the cones 34. Hence, the spacers 52 and 54 establish the setting for the bearing assembly A. The solid spacer 52, which is the longer and stronger of the two, at one end bears against the inboard cone 34 and encircles the entire intervening surface 12. The collapsible spacer 54 lies between the front face 44 of the outboard cone 34 and the other end of the solid spacer 54. It is the weaker of the two in the sense that it will collapse axially before the solid spacer 52, that is it will undergo plastic deformation in the presence of an axially directed compressive force less than that required to plastically deform the solid spacer 52 and, of course, less than that required to plastically deform the cones 34 as well. Indeed, the adjusting procedure imparts plastic deformation to the collapsible spacer 54, with the magnitude of the deformation being that which provides the bearing assembly A with its optimum setting. That setting, which is predetermined, will exist within a range extending between a very slight amount of end play and a very slight amount of preload.

Figure 2:
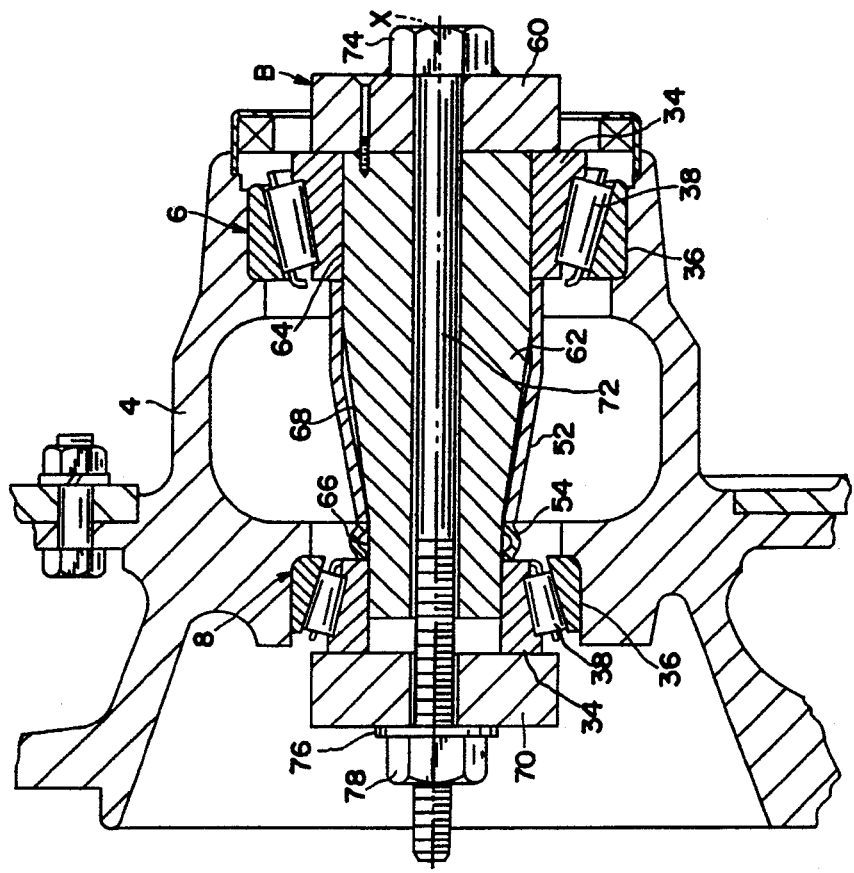
FIG. 2 is a sectional view showing the bearing assembly and one of two components connected by it, together with an adjusting tool for collapsing the spacer, all before the spacer is actually collapsed.
Figure 3:
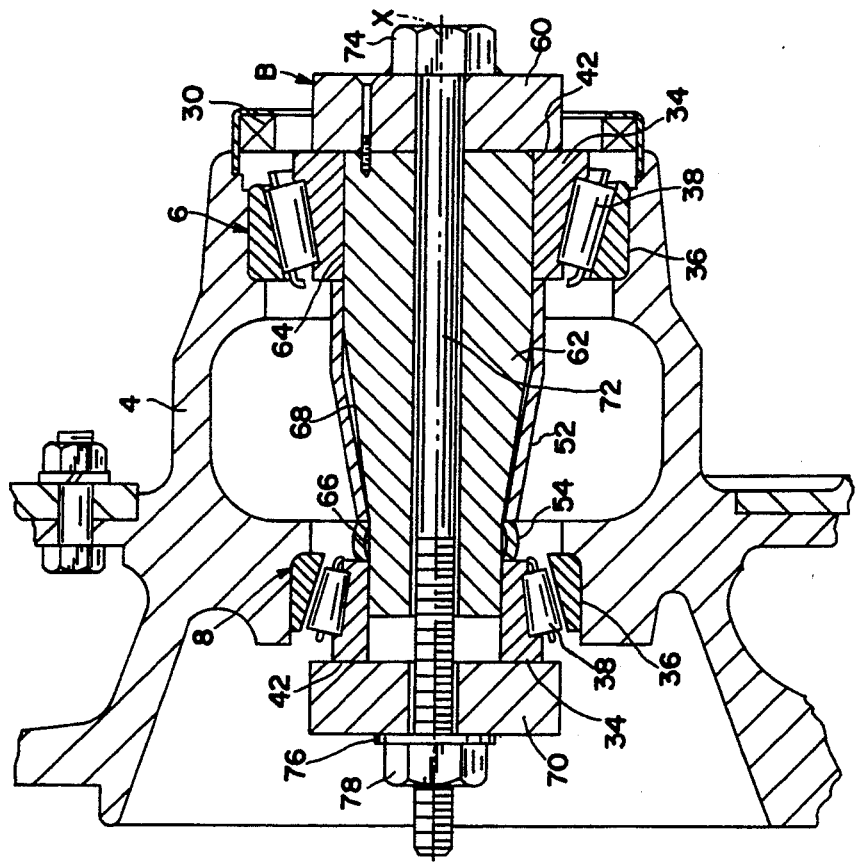
FIG. 3 is a sectional view similar to FIG. 2, but showing the spacer collapsed by the adjusting tool.

In contrast to the conventional procedure, the adjusting process establishes the proper setting for the bearings 6 and 8 of the bearing assembly A while the hub 4 and its wheel 24 are removed from the spindle 2, yet with the bearings 6 and 8 in the hub 4. It requires a simple adjusting tool B (FIGS. 2 & 3), including an inner clamp plate 60 and pilot 62 which is fastened to the plate 60 and vaguely resembles the spindle 2. To this end, the pilot 62 has a large diameter seat 64, a small diameter seat 66, and an intervening surface 68 between the seats 64 and 66. The inboard cone 34 fits loosely over the large seat 64, whereas the outboard cone 34 fits loosely over the small seat 66, with the solid spacer 52 fitting around the intervening surface 68. Initially, the collapsible spacer 54 exists in an extended or uncollapsed condition, and it fits loosely around the small seat 66 (FIG. 2). But the pilot 62 is shorter than the spindle 2 and likewise shorter than the combined lengths of the two cones 34, the solid spacer 52, and the extended collapsible spacer 54. Thus, when the inboard cone 34, the solid spacer 52, the extended collapsible spacer 54, and the outboard cone 34 are placed in that order over the pilot 62, with the back face 42 of the inboard cone 34 against the inner clamp plate 60, the small end of the pilot 62 will be within the outboard cone 34, and as such is offset somewhat from the back face 42 of that cone. The clamp plate 60, while being of greater diameter than the large seat 64, is of lesser diameter than the seal 30 in the hub 4 and will not interfere with the seal 30 when the hub 4 is placed over the pilot 62 and plate 60.

In addition, the adjusting tool B has an outer clamp plate 70 which is essentially the same as the inner plate 60, except that it is detached from the pilot 62. Finally, the tool B has a clamp bolt 72 which extends through the two plates 60 and 70 and the pilot 62, and has a hexagonal head 74 which is too large to pass through the inner plate 60. Indeed, the head 74 is welded or otherwise attached to the plate 60, so the bolt 72 will not rotate or shift axially with respect to the inner plate 60 and pilot 62. The bolt 72 projects beyond the outer clamp plate 70 where it is fitted with a washer 76 and a nut 78. Finally, the tensile yield strength of the bolt 72 exceeds the compressive yield strength of the collapsible spacer 54.

The tool B is quite small and can easily be grasped and lifted with one hand, at least when configured to adjust the bearing assembly A for an on-highway truck wheel.

To set the bearing assembly A, the hub 4 and its wheel 24 must be removed from the spindle 2, but the necessity for adjusting the bearing assembly A no doubt resulted from the removal of the hub 4 and wheel 24 in the first place, perhaps to clean and relubricate the bearings 6 and 8, so the detachment of the hub 4 from the spindle 2 really does not introduce an additional step into the procedure. Initially, the cups 36 for the bearings 6 and 8 are pressed into their respective counterbores 18 and advanced to the shoulders 20 at the ends of those counterbores 18, if they are not already in place.

Now, with the hub 4 separated from the spindle 2 and the cups 36 in place, the mechanic installs the cone 34 and rollers 38 for the inboard bearing 6 in the cup 36 for that bearing so that the rollers 38 generally seat along the raceways 40 of the cone 34 and cup 36. The mechanic thereupon inserts the bolt 72 and pilot 62 through the cone 34 of the inboard bearing 8 from the back face 42 of the cone 34 and advances them until the clamp plate 60 comes against the back face 42. Thereupon, while holding the plate 60 against cone 34 of the bearing 6, the mechanic installs the solid spacer 52 and the collapsible spacer 54 in that order over the bolt 72 and pilot 62, bringing the solid spacer 52 against the front face 44 of the inboard cone 36.

While continuing to hold the inner clamp plate 60 so that the inboard cone 34, the clamp plate 60, bolt 72 and pilot 62, and the spacers 52 and 54 remain in hub 4, the mechanic installs the cone 34 for the outboard bearing 8 over the free end of the pilot 62 and into outboard cup 36. The front face 44 of the outboard cone 34 abuts against the collapsible spacer 54, before the rollers 38, which surround the outboard cone 34, seat against the raceways 40 of the cone 34 and cup 36. Indeed, the two spacers 52 and 54 maintain enough separation between the two cones 34 to place the bearing assembly A in a condition of excessive end play (FIG. 2). Thereafter the outer clamp plate 70 is installed over the threads of the bolt 72 and against the back face 42 of the outboard cone 34, and to hold the entire arrangement together, the washer 76 and nut 78 are fitted over the threaded end of the bolt 72. Indeed, the mechanic tightens the nut 78 until the two cones 34 and the two spacers 52 and 54 are all clamped snugly together between the clamp plates 60 and 70 (FIG. 2). The bearing assembly A as such exists in a condition of excessive end play. In this condition, the clamped together plates 60 and 70, the cones 34 and spacers 52 and 54 will rotate as a unit easily in the hub 4 with little resistance. In other words, the drag torque, that is to say the torque required to effect rotation of those clamped together components, is negligible.

The mechanic now holds the head 74 of the bolt 72 with one wrench and tightens the nut 78 with another. The axially directed force drives the two cones 34 together and the collapsible spacer 54 begins to collapse. The mechanic continues to tighten the nut 78 on the bolt 72, thereby permanently reducing the length of the collapsible spacer and along with that reduction removing end play from the bearing assembly A. At this point, end play should still exist in the bearing assembly A and drag torque should remain minimal.

Actually, the mechanic advances the nut 78 incrementally and after each incremental advance, checks the drag torque in the bearing assembly A by turning nut 78 without restraining the bolt 72, so that the nut 78 and bolt 72 turn together. The inboard and outoard cones 34 and the rollers 38 rotate within the cups 36 which are held stationary in the hub A. Eventually, all end play is removed. Further tightening of the nut 78 and collapse of the spacer 54 at this point advances the bearing assembly A into preload—a condition in which the rollers 38 are compressed between the raceways 40 of the cones 34 and cups 36. Preload in the bearing assembly A causes the drag torque to increase. The mechanic will detect this increase by rotating the nut 78 without restraining the bolt 72. This signifies the onset of preload. The mechanic continues the incremental advances of the nut 78 over the bolt 72 (FIG. 3) and monitors the drag torque after each advance until the drag torque reaches a prescribed value. For a typical truck wheel, that drag torque should be at least 5 in-lbs., the minimal torque required to detect preload in the bearing assembly A, but should not exceed 30 in-lbs. While an experienced mechanic should be able to determine simply by feel when the drag torque enters this range, the preferred procedure relies on measurement of actual drag torque with a torque measuring device, such as, a torque wrench.

The presence of a discernible drag torque indicates that the bearing assembly A is in preload. But the drag torque to which the tool B and wrenches bring the bearing assembly A, does not represent the true operating condition for the bearing assembly A on the spindle 2. In this regard, as the nut 78 is tightened down over the bolt 72, both the solid spacer 52 and the collapsible spacer 54 undergo elastic deformation under the compressive force. The collapsible spacer 54 then yields plastically as the force increases. Once the bearing assembly A produces the desired drag torque, the nut 78 is backed off on the bolt 72, thus relieving the compressive force. Both the solid spacer 52 and the collapsible spacer 54 recover their elastic deformation, but the collapsible spacer 54 does not recover its plastic deformation. The recovered elastic deformation may place the bearing at zero end play or perhaps in a condition of slight end play.

In any event, once the collapsible spacer 54 is compressed to the size which yields the desired drag torque—and likewise produces the correct length—the mechanic removes the assembly tool B from the hub 4, this involving nothing more than unscrewing the nut 78 from the end of the bolt 72 and then withdrawing the clamp plate 70 from one end of the hub 4 and the clamp plate 60, pilot 62, and bolt 72 from the other end. The cones 34 and spacers 52 and 54 are likewise withdrawn from the hub 4.

Now the hub 4 and bearings 6 and 8 are in condition for installation over the spindle 2. To this end, the mechanic places the inboard cone 34 over the spindle 2 and brings its back face 42 against the shoulder 14. This presents the complement of rollers 38 for the inboard bearing 6 outwardly. Next the mechanic lifts the wheel 24 to the spindle 2 and advances the hub 4 over the spindle 2 with the seal 30 leading. The seal 30 passes over the rollers 38 that are around the inboard cone 34 and then embraces the spindle 2 beyond its shoulder 14. Thereupon, the mechanic fits the solid spacer 52 over the spindle 2 and then the collapsible spacer 54, that is the spacer 54 after it has been compressed to the required length with the adjusting tool B. The solid spacer 52 comes against the front face 44 of the inboard cone 34, whereas the collapsed spacer 54 fits against the small end of the solid spacer 52. Next the outboard cone 34 is fitted over the spindle 2 with its front face 44 leading and thus presented toward the collapsed spacer 54. The rollers 38 of that cone 34 move into the raceway 40 of the outboard cup 36. Thereupon, the nut 48 is installed on the threaded end 16 of the spindle 2 and run down against the back face 42 of the outboard cone 34. It is tightened with a prescribed amount of torque which produces an axial force substantially less than that required to plastically deform the collapsible spacer 54 or for that matter cause it to undergo much elastic deformation. Indeed, the force exerted on the collapsed spacer 54 should be less than one-fourth the force required to cause the spacer 54 to yield plastically. Then the locking device 51 is installed over the threaded end 16 and engaged with the spindle nut 48, whereupon the jam nut 50 is tightened down against the locking device 51, to secure the spindle nut 48 and transfer thread clearance from one side of the thread to the other. This brings the bearing assembly A into proper adjustment, for its setting has already been determined by the combined lengths of the two spacers 52 and 54. Finally, the end cap 32 is fitted to the outboard end of the hub 4 to close the hollow interior at that end (FIG. 1).

The adjusting tool B and the procedure which it facilitates enable the bearing assembly A to be adjusted quickly and without sophisticated tools and delicate measuring devices. Moreover, the procedure achieves a high degree of accuracy, yielding a very precise setting.

The tool B and procedure are suitable for use with other types of bearings which may be adjusted against each other, angular contact ball bearings and spherical roller bearings for example. Moreover, it is suitable for bearing assemblies in applications other than the road wheels of automotive vehicles.

This invention is intended to cover all changes and modifications of the example of the invention herein chosen for purposes of the disclosure which do not constitute departures from the spirit and scope of the invention.

What is claimed is:

1. A process for adjusting a bearing assembly located between a first machine component which rotates relative to a second machine component, the bearing assembly essentially including raceways which are carried by the first component in a fixed position on that component, races carried by the second component, but being detachable from that component with each race having a raceway that is presented toward one of the raceways on the first component, and rolling elements arranged in two rows between the raceways of the first component and the raceways on the races of the second component, the raceways and rolling elements being configured to transmit radial loads between the components and to further transfer thrust loads in both axial directions between the components, whereby the spacing between the detachable races determines the setting for the bearing; said process comprising: with the detachable races detached from the second machine component, fitting the races to the raceways of the first component with the rolling elements between the raceways of the first component and the raceways of the races; installing a spacer between the detachable races, with the spacer initially being long enough to place the bearing assembly in a condition of excessive end play, the spacer being collapsible under a force which the races will withstand without collapsing; applying an axially directed force to the two races, the direction of which causes the assembly to approach a condition of preload; monitoring the drag torque of the bearing assembly; and terminating and removing the axially directed force on the races when the drag torque reaches a prescribed magnitude.

2. The process according to claim 1 and further comprising: installing the detachable races on the second component such that they are fitted to the raceways of the first component with the rolling elements interposed between the raceways of the first component and the raceways of the races; installing the collapsed spacer between the detachable races; and clamping the detachable races and spacer together without plastically deforming the spacer so that the spacer determines the spacing between the races and hence the setting of the bearing assembly.

3. The process according to claim 2 wherein the raceways of the first component are presented inwardly toward the axis of rotation and the raceways on the races are presented outwardly away from the axis of rotation.

4. The process according to claim 3 and further comprising installing the races and the collapsed spacer over a spindle having a shoulder at one end and means at the other end for exerting a clamping force such that the races and spacer are clamped firmly between said means and the shoulder.

5. The process according to claim 3 and further comprising installing the races and the collapsed spacer over a spindle having a shoulder at one end and threads at its other end, with the one race being against the shoulder, the other race being presented toward the threads and the collapsed spacer being between the races, and installing a nut over the threads and turning it down so that the two races and the spacer are clamped between the nut and the shoulder.

6. The process according to claim 3 and further comprising fitting the races and the collapsible spacer over a pilot and between clamp plates as the axially directed force is applied to the races to collapse the spacer.

7. The process according to claim 6 wherein the step of applying the axially directed force includes extending a threaded element between the clamp plates and through the pilot, and installing a nut over the threaded element and tightening it to urge the clamp plates together.

8. The process according to claim 2 and further comprising installing a solid spacer between one of the races and the collapsible spacer so that the solid and collapsible spacers occupy the entire space between the races when the axial force is applied, and thereafter installing the solid spacer between the races along with the collapsed spacer on the second machine component so that the two spacers occupy the entire space between the races on the second machine component.

9. A process for adjusting a bearing assembly located between a hub and a spindle for enabling the hub to rotate relative to the spindle about an axis of rotation, the bearing assembly including two raceways located in the hub where they are normally fixed in position, two detachable races that normally fit over the spindle and have raceways that are presented toward the raceways of the hub, and rolling elements arranged in two rows between the raceways in the hub and the raceways on the races, the raceways and rolling elements being oriented and configured to transfer radial loads between the spindle and hub and also thrust loads in both axial directions, the races being located on the spindle between a shoulder and a securing device, said process comprising: with the hub withdrawn and detached from the spindle, installing the two detachable races and the rolling elements in the raceways of the hub such that the rolling elements are along the raceways of the hub and races; fitting a collapsible spacer between the two races, with the spacer being large enough to place the bearing assembly in a condition of excessive end play; forcing the races together with enough force to collapse the spacer; monitoring the drag torque of the bearing assembly as the races are forced together; and removing the force when the drag torque reaches a prescribed magnitude, whereby the collapsed spacer will separate the races a distance which will provide the bearing assembly with the desired setting.

10. The process according to claim 9 wherein the force applied to the races is increased incrementally and, between incremental increases, the drag torque is monitored.

11. The process according to claim 10 wherein the force is applied by turning a nut over a threaded bolt.

12. The process according to claim 9 and further comprising locating the detachable races and spacer around a pilot while the hub is withdrawn and detached from the spindle and the races are within the raceways of the hub, and positioning clamp plates at opposite ends of the races so that the two races and the spacer are between the clamp plates; and wherein the force is applied to the clamp plates and transmitted to the races through the clamp plates.

13. The process according to claim 12 wherein the force is applied by turning a nut which threads over a threaded bolt that extends between the two clamp plates and through the pilot.

14. The process according to claim 13 wherein the nut is turned incrementally and the drag torque of the bearing assembly is monitored between incremental turns of the nut.

15. The process according to claim 9 and further comprising: after the spacer has been collapsed to a size which will provide the bearing assembly with the correct setting, installing the races, collapsed spacer and hub over the spindle with the races located within the raceways of the hub and the rolling elements located between the raceways of the hub and races and the spacer between the races; and installing the securing device on the spindle, and with the securing device, clamping the races and spacer between the securing device and the shoulder of the spindle without plastically deforming the spacer, whereby the bearing assembly, when on the spindle, possesses the correct setting.

16. The process according to claim 15 wherein the securing device includes a nut that is threaded over the end of the spindle.

17. The process according to claim 15 wherein the raceways and rolling elements are tapered and are arranged in the indirect configuration.

* * * * *